(12) United States Patent
Hassan et al.

(10) Patent No.: US 10,551,563 B2
(45) Date of Patent: Feb. 4, 2020

(54) OPTICAL GUIDE COMPRISING A BEND WITH A PSEUDO-INDEX GRADIENT

(71) Applicant: COMMISSARIAT À L'ÉNERGIE ATOMIQUE ET AUX ÉNERGIES ALTERNATIVES, Paris (FR)

(72) Inventors: Karim Hassan, Moneteau (FR); Salim Boutami, Grenoble (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 0 days.

(21) Appl. No.: 16/332,846

(22) PCT Filed: Sep. 18, 2017

(86) PCT No.: PCT/FR2017/052479
§ 371 (c)(1),
(2) Date: Mar. 13, 2019

(87) PCT Pub. No.: WO2018/055267
PCT Pub. Date: Mar. 29, 2018

(65) Prior Publication Data
US 2019/0212493 A1 Jul. 11, 2019

(30) Foreign Application Priority Data

Sep. 20, 2016 (FR) .................................... 16 58809

(51) Int. Cl.
*G02B 6/10* (2006.01)
*G02B 6/125* (2006.01)
(Continued)

(52) U.S. Cl.
CPC ................ *G02B 6/125* (2013.01); *G02B 6/14* (2013.01); *G02B 2006/12119* (2013.01)

(58) Field of Classification Search
CPC . G02B 6/125; G02B 2006/12119; G02B 6/14
See application file for complete search history.

(56) References Cited

U.S. PATENT DOCUMENTS 6,334,014 B1 * 12/2001 Nitta .................. G02B 6/29358
385/24
7,876,495 B1 1/2011 Minelly
(Continued)

FOREIGN PATENT DOCUMENTS

EP 0668517 A1 8/1995
EP 1058136 A1 * 12/2000 ......... G02B 6/12011
(Continued)

OTHER PUBLICATIONS

International Search Report for PCT/FR2017/052479 dated Dec. 14, 2017.
(Continued)

*Primary Examiner* — Ellen E Kim
(74) *Attorney, Agent, or Firm* — Pearne & Gordon LLP (57) ABSTRACT

An optical guide comprising a core that has a entrance segment that is rectilinear in an entrance direction, an exit segment that is rectilinear in an exit direction, and a transition segment between the rectilinear entrance segment and the rectilinear exit segment. The exit direction is different from the entrance direction so that light propagates between the entrance segment and the exit segment in a propagation direction that has a bend having an interior side and an exterior side. The transition segment comprises a region with a pseudo-index gradient, this region having an interior edge on the interior side of the bend and an exterior edge on the exterior side of the bend. The region with the pseudo-index gradient comprises trenches formed in the core in order to make a refractive index decrease from the interior edge to the exterior edge.

15 Claims, 6 Drawing Sheets

(51) Int. Cl.
 *G02B 6/14* (2006.01)
 *G02B 6/12* (2006.01)

(56) References Cited

U.S. PATENT DOCUMENTS

| | | |
|---|---|---|
| 2013/0017082 A1 | 7/2013 | Pitwon |
| 2015/0285737 A1 | 10/2015 | Gliere et al. |
| 2016/0091676 A1 | 3/2016 | Favreau et al. |
| 2016/0124145 A1 | 5/2016 | Hassan et al. |
| 2016/0299292 A1 | 10/2016 | Hassan et al. |
| 2017/0097301 A1 | 4/2017 | Lefebvre et al. |
| 2017/0102323 A1 | 4/2017 | Boutami et al. |
| 2018/0039024 A1 | 2/2018 | Boutami et al. |
| 2018/0335568 A1 | 11/2018 | Hassan et al. |
| 2019/0011261 A1 | 1/2019 | Taurel et al. |
| 2019/0018197 A1 | 1/2019 | Boutami et al. |
| 2019/0064632 A1 | 2/2019 | Hassan et al. |
| 2019/0094467 A1 | 3/2019 | Hassan et al. |
| 2019/0113446 A1 | 4/2019 | Boutami et al. |
| 2019/0120755 A1 | 4/2019 | Boutami et al. |
| 2019/0195779 A1 | 6/2019 | Boutami et al. |

FOREIGN PATENT DOCUMENTS

| | | | |
|---|---|---|---|
| JP | H02-301701 A | 12/1990 | |
| JP | H05-288943 A | 11/1993 | |
| WO | 0029883 * | 5/2000 | ............ G02B 6/023 |
| WO | 2006021609 A1 | 3/2006 | |
| WO | 2012075509 A2 | 6/2012 | |
| WO | 2017211936 A1 | 12/2017 | |

OTHER PUBLICATIONS

Written Opinion for PCT/FR2017/052479 dated Dec. 14, 2017.
Search Report for French Application No. 1658809 dated May 9, 2017.
U.S. Appl. No. 16/202,682 entitled "Photonic Chip With Folding of Optical Path and Integrated Collimation Structure", filed Nov. 28, 2018.
U.S. Appl. No. 16/260,655 entitled "Photonic Chip With Integrated Collimation Structure", filed Jan. 29, 2019.
Heiblum, Mordehai, et all. "Analysis of Curved Optical Waveguides by Conformal Transformation" IN: IEEE Journal of Quantum Electronics, Feb. 1975, vol. QE-11, No. 2, pp. 75-83.

* cited by examiner

OPTICAL GUIDE COMPRISING A BEND WITH A PSEUDO-INDEX GRADIENT

CROSS-REFERENCE TO RELATED APPLICATIONS

This is a National Stage application of PCT international application PCT/FR2017/052479, filed on Sep. 18, 2017, which claims the priority of French Patent Application No. 16 58809, filed Sep. 20, 2016, both of which are incorporated herein by reference in their entireties.

TECHNICAL FIELD

The field of the invention is that of structures for guiding light used in photonic and optoelectronic circuits. The invention relates more particularly to guiding structures in which the light is subjected to a change in direction by the introduction of a break or of a curved trajectory between two rectilinear paths.

PRIOR ART

The propagation of optical signals on a chip requires a good compromise between losses and compactness. According to the intended use, the total optical path can vary between several millimetres for a single function (emission, modulation, filtering, photo-detection) and a plurality of centimetres for the most complex circuits.

In this context, silicon photonics provide, in addition to the compatibility with electronics, a platform that is extremely efficient via the strong refractive index contrast of the waveguides between the core (generally made of silicon) and the cladding (generally made of silica) which results in very low linear propagation losses. Nevertheless, for the longest circuits, it often turns out to be necessary to use wide guides (above the single-mode limit) in order to gain an order of magnitude in terms of the optical losses.

This gain in terms of losses, however, poses a problem for the guiding. Indeed, only the narrow guides allow management, with reasonable losses, of the curves. Thus, in order to allow the creation of bends and various curves with wide guides, it is necessary to create multiple transitions between wide guides and narrow guides, with sometimes highly elaborate shapes in the curves and transitions for example as described in the patent EP 0 668 517 B1.

Alternatively, it is possible to directly create the bends with wide guides, but the dimensions are then imposing since large radii of curvature must be provided.

DISCLOSURE OF THE INVENTION

The invention aims to allow the guiding of light in a photonic circuit by means of wide guides in order to limit the losses and with small radii of curvature in such a way as to limit the footprint of the circuit.

In order to satisfy this search for an optimal compromise between losses and compactness, the invention proposes an optical guide comprising a core made from a core material having a refractive index nc, the core comprising a rectilinear input section oriented in an input direction, a rectilinear output section oriented in an output direction, and a transition section between the rectilinear input section and the rectilinear output section. The output direction is different that the input direction in such a way that the light propagates in the optical guide between the input section and the output section in a propagation direction while being subjected to a bend having an inner side and an outer side.

The transition section comprises a region with a pseudo-index gradient having an inner edge on the inner side of the bend and an outer edge on the outer side of the bend. This region comprises trenches having a refractive index nr lower than the refractive index nc of the core material. The trenches have the same depth and are formed in the core in such a way that the region with a pseudo-index gradient has a refractive index that decreases from the inner edge towards the outer edge.

Certain preferred but non-limiting aspects of this optical guide are the following:
- the refractive index decreases linearly from the inner edge towards the outer edge;
- the trenches are arranged periodically between the inner edge and the outer edge, and the width of the trenches increases from one period to another from the inner edge towards the outer edge;
- the trenches are formed in such a way as to have an increasing density of trenches from the inner edge towards the outer edge;
- the transition section is a rectilinear section oriented in the input direction, or a curved section in the shape of an arc of a circle;
- the trenches can be curved according to the curvature of the transition section, and extend over the entire length of the transition section.

BRIEF DESCRIPTION OF THE DRAWINGS

Other features and advantages will appear in the following description of the optical guide according to the invention, given as non-limiting examples, in reference to the appended drawings in which.

DETAILED DISCLOSURE OF SPECIFIC EMBODIMENTS

Figure 1:
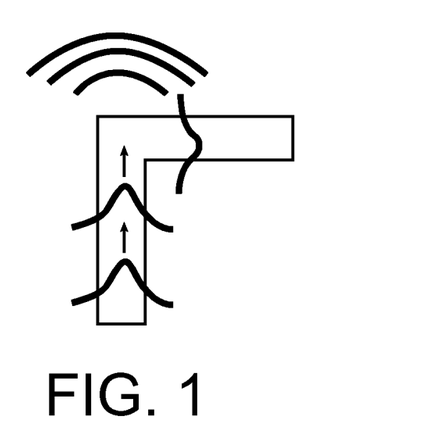
FIG. 1 is a top-view diagram illustrating an optical guide integrating a break between two rectilinear optical paths.
Figure 2:
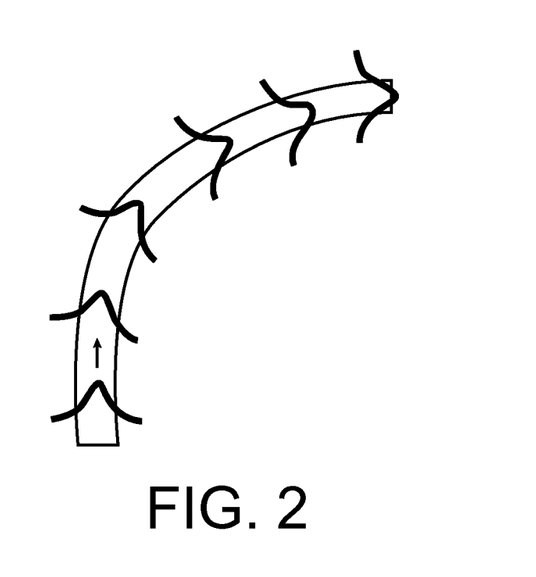
FIG. 2 is a top-view diagram illustrating an optical guide having a curved trajectory.

FIG. 1 shows a diagram of an optical guide integrating a break between two rectilinear optical paths, in the form of an abrupt bend of 90°. With such a right-angle break, the light is confronted with strong radiation losses, whether the guide is narrow or wide. In order to prevent such a break, it is thus possible to resort to a curve having a large radius as is shown in FIG. 2. The transfer of the electromagnetic field out of the guide is thus minimised, but to the detriment of the compactness.

Figure 3:
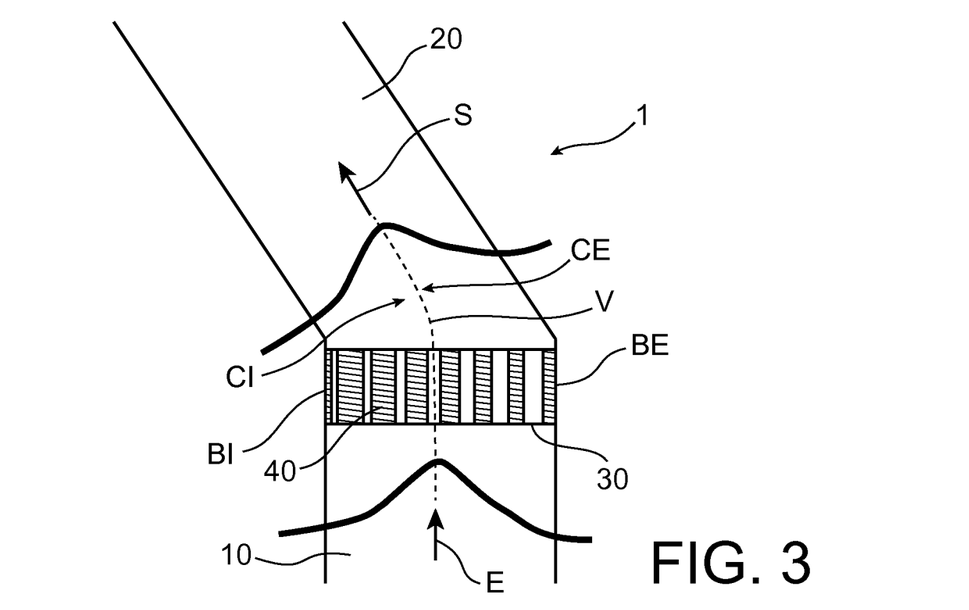
FIG. 3 is a top-view diagram of an optical guide according to the invention integrating a region with a pseudo-index gradient in a rectilinear transition section between two non-aligned rectilinear paths.

FIG. 3 shows a diagram of an optical guide 1 according to the invention in which the light is deviated while preserving a uniform wave front.

According to the invention, the optical guide 1 can be a planar waveguide ("Planar waveguide" or "Slab waveguide" in the Anglo-Saxon terminology), a channel waveguide ("Ridge waveguide" in the Anglo-Saxon terminology), or a rib waveguide ("Rib waveguide" in the Anglo-Saxon terminology).

The optical guide 1 comprises a core made from a core material, for example silicon. The core is surrounded by a cladding made from a material having a refractive index lower than that of the core material, for example from silica.

The core has different portions, including a rectilinear input section 10 oriented in an input direction E, a rectilinear output section 20 oriented in an output direction S, and a transition section 30 between the rectilinear input section and the rectilinear output section. The output direction S is different than the input direction E in such a way that the light propagates in the optical guide between the input section 10 and the output section 20 in a propagation direction while being subjected to a bend V having an inner side CI and an outer side CE.

In the example of FIG. 3, the transition section is a rectilinear section oriented in the input direction E, and the bend is then abrupt with an instantaneous (or immediate) change in direction. The invention also extends, however, as will be described below, to a curved transition section, in the shape of an arc of a circle with a centre of curvature to the inside of the bend. The arc of a circle starts in the input direction and ends in the output direction. The bend is thus less abrupt, since the change in direction is gradual.

The transition section 30 comprises a region 40 with a pseudo-index gradient that has an inner edge BI on the inner side CI of the bend V and an outer edge BE on the outer side CE of the bend V.

In the context of the invention, pseudo-index gradient means that the region 40 does not comprise a true profile of variation in the refractive index of the core material as is the case of the structures called "graded-index" (or GRIN) structures, but that it has the same properties. Thus, when it passes through the region 40, the light encounters the equivalent of a gradient in refractive index.

With such a region with a pseudo-index gradient, the light is deviated while preserving a uniform wave front, which guarantees the preservation of the input mode (here the fundamental mode with a maximum in intensity centred in the middle of the guide). It thus turns out to be possible to curve the guided light with very small radii of curvature, without modal modification and without radiated modes, between wide, low-loss input and output guides.

The region 40 with a pseudo-index gradient is more precisely a result of a structuration of the core. In reference to FIG. 4 which shows a cross-sectional view, orthogonally to the direction of propagation of the light, this region 40 comprises trenches T1-T4 formed in a layer of the core material 2. The number of four trenches is given here purely as an example, the invention extending to any number of trenches, preferably a number greater than or equal to seven in the uses intended by the invention, with it being understood that the more trenches there are, the smoother the (pseudo-)index gradient.

Figure 4:
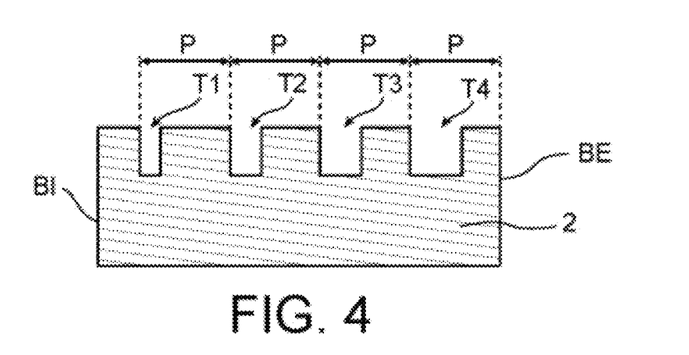
FIG. 4 is a cross-sectional view of a region with a pseudo-index gradient of an optical guide according to the invention.

The trenches T1-T4 are arranged between the inner edge BI and the outer edge BE of the section 40 in such a way as to create the pseudo-index gradient with a decrease in index from the inner edge towards the outer edge.

In one example of an embodiment, the width of the trenches increases from the inner edge BI towards the outer edge BE. In this example of an embodiment, the trenches T1-T4 are preferably arranged periodically, according to a period P, between the inner edge BI and the outer edge BE. The width of the trenches thus increases from one period to the other from the inner edge BI towards the outer edge BE. Since the optical guide is intended to guide quasi-monochromatic light radiation having a wavelength λ according to an optical mode associated with an effective refractive index neff, the width of a period P is less than the ratio of the wavelength λ to the effective refractive index neff, and is preferably close to the ratio of the wavelength λ to two times the effective refractive index neff.

In another example of an embodiment, there can be a greater density of trenches on the outside of the bend than on the inside, for example an increasing density of trenches from the inside towards the outside of the bend. This increase in the density can be linear. The trenches can have the same width.

In one possible embodiment, the width of the trenches can increase progressively, for example linearly or exponentially, in the direction of propagation of the light until a threshold width is reached, which is maintained until the end of the region with a pseudo-index gradient is reached. Thus, an apodisation of the region with a pseudo-index gradient is carried out, the latter appearing progressively in the direction of propagation of the light. This threshold width corresponds to the width mentioned above.

The trenches T1-T4 all have the same depth, less than or even equal to the thickness of the layer of core material 2. The transverse cross-section of the trenches of the plurality of trenches 41 has a rectangular shape. Transverse cross-section of a trench means the intersection of the trench with a plane perpendicular to the direction of propagation of the light.

The largest dimension of the trenches extends in the direction of propagation of the light. This largest dimension is understood to be a length, in reference to the width and to the depth mentioned above.

The layer of core material 2 is made from a core material having a refractive index nc, and the trenches T1-T4 have a refractive index nr different than the refractive index nc of the core layer, for example because they are filled with a filling material having such an index nr. The filling layer is for example $SiO_2$ silica. Alternatively, the trenches are not filled with a filling material and are left open to air.

The difference between the refractive indices of the core material and of the filling material is preferably at least equal to 0.2. The refractive index of the core material is greater than the refractive index of the trenches, in such a way as to ensure a (pseudo-)index gradient that decreases from the inner edge towards the outer edge. Thus, the region with a pseudo-index gradient has, on the inner-edge side, an index close to that of the core material and, on the outer-edge side, an index close to that of the filling material, with a decrease in this index from the inner edge towards the outer edge.

When a periodic increase in the width of the trenches is provided, this increase is preferably carried out according to a parabolic rule in such a way as to create a (pseudo-)index gradient 40 decreasing linearly from the inner edge towards the outer edge, wherein the latter can be expressed, for a period having the index i, according to:

$$n_i = \sqrt{f_i * \varepsilon_r + (1-f_i) * \varepsilon_c}$$

With $f_i$ the filling factor of the period having the index i (or $f_i = e/P$, with e, the width of the trench of the period having the index i), $\varepsilon_r$, the permittivity of the trench (air or filling material) and $\varepsilon_c$ the permittivity of the core material.

This linearity of the (pseudo-)index gradient can also be obtained by a suitable control of the density of the trenches.

Preferably, the input section, the output section and the transition section have the same width, as measured locally in a plane orthogonal to the direction of propagation of the light. Transitions between guides having different widths are thus avoided. These sections have for example a width greater than or equal to the angular cutoff frequency of the mode $TE_{mn}$ such that m and n are greater than 1. Such a width corresponds to any guiding structure supporting modes greater than the fundamental modes called by a person skilled in the art $TE_{00}$ or $TM_{00}$.

Figure 5:
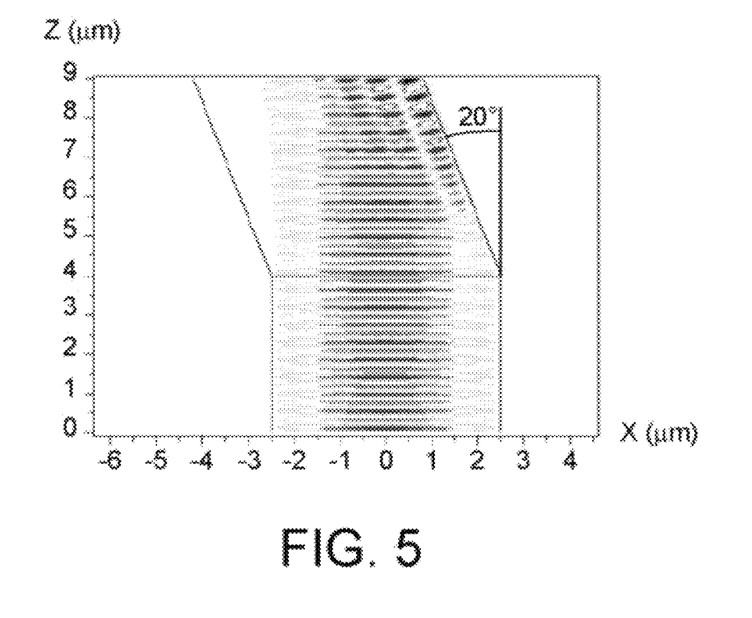
FIGS. 5 and 6 show the electromagnetic-field distribution in a guide having an abrupt bend of 20°, respectively not provided and provided with a section with a pseudo-index gradient.

FIG. 5 shows the electromagnetic-field distribution in a guide having an abrupt bend of 20°, not provided with a region with a pseudo-index gradient. As for FIG. 6, it shows the electromagnetic-field distribution in a guide having an abrupt bend of 20°, but in which a rectilinear transition section as shown in FIG. 3 comprises a region with a pseudo-index gradient according to the invention.

Figure 6:
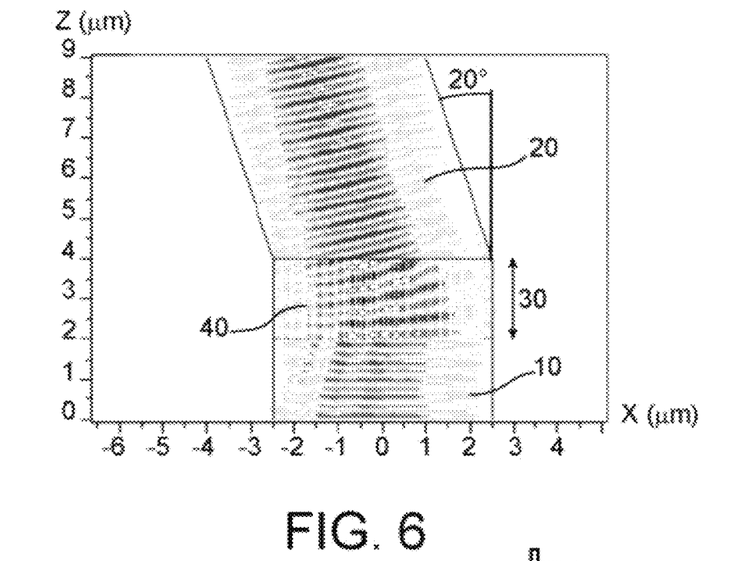

These drawings result from 2D calculations of finite differences in the time domain (FDTD-2D) in order to evaluate the effectiveness of the region with a pseudo-index gradient for deviating, by 20°, the fundamental optical mode of a wide guide, and thus capable of exciting undesirable higher modes, the various sections of which have here a width of 5 m. In FIG. 6, the region with a pseudo-index gradient has a length, in the direction of propagation of the light, of 2 m. This region 40 comprises 19 trenches arranged periodically, the width of which varies linearly from 17 nm to 242 nm, and filled with silica.

For the guide of FIG. 5, the total power transferred (any mode) is less than 10% of the incident power. On the contrary, for the guide of FIG. 6 according to the invention, the total power transferred is greater than 95% of the incident power. The effectiveness of the (pseudo-)index gradient on the deviation of the incident beam is thus particularly pronounced. Nevertheless, disturbances to the left of the guide are observed, on the inner side of the bend. They are generated by a too-great effectiveness of the deviation, and it may thus be preferable to place the linear (pseudo-)index gradient in a curve rather than in a rectilinear section.

Thus in another embodiment of the invention, the transition section is a curved section in the shape of an arc of a circle, the centre of curvature of which is to the inside of the bend.

Figures 7A, 7B:
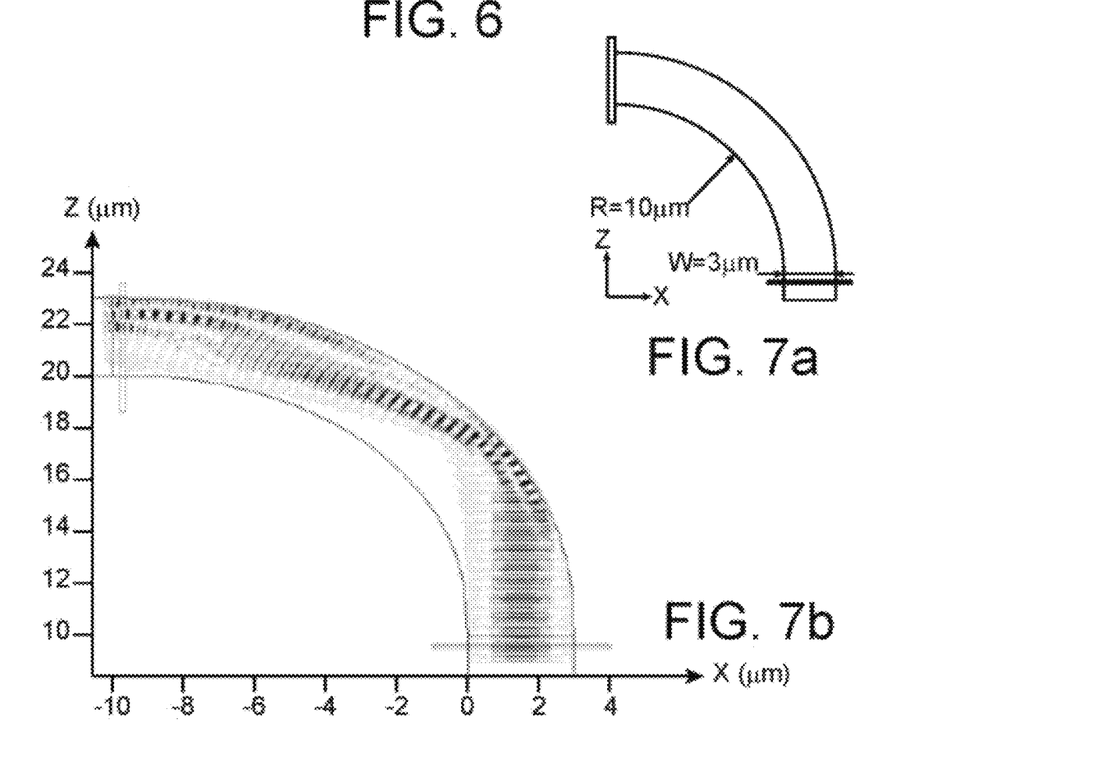
FIGS. 7a and 7b respectively illustrate a guide having a width of 3 µm that has a bend of 90° having a radius of curvature of 10 µm not provided with a section with a pseudo-index gradient and the electromagnetic-field distribution inside the latter.
Figures 8A, 8B:
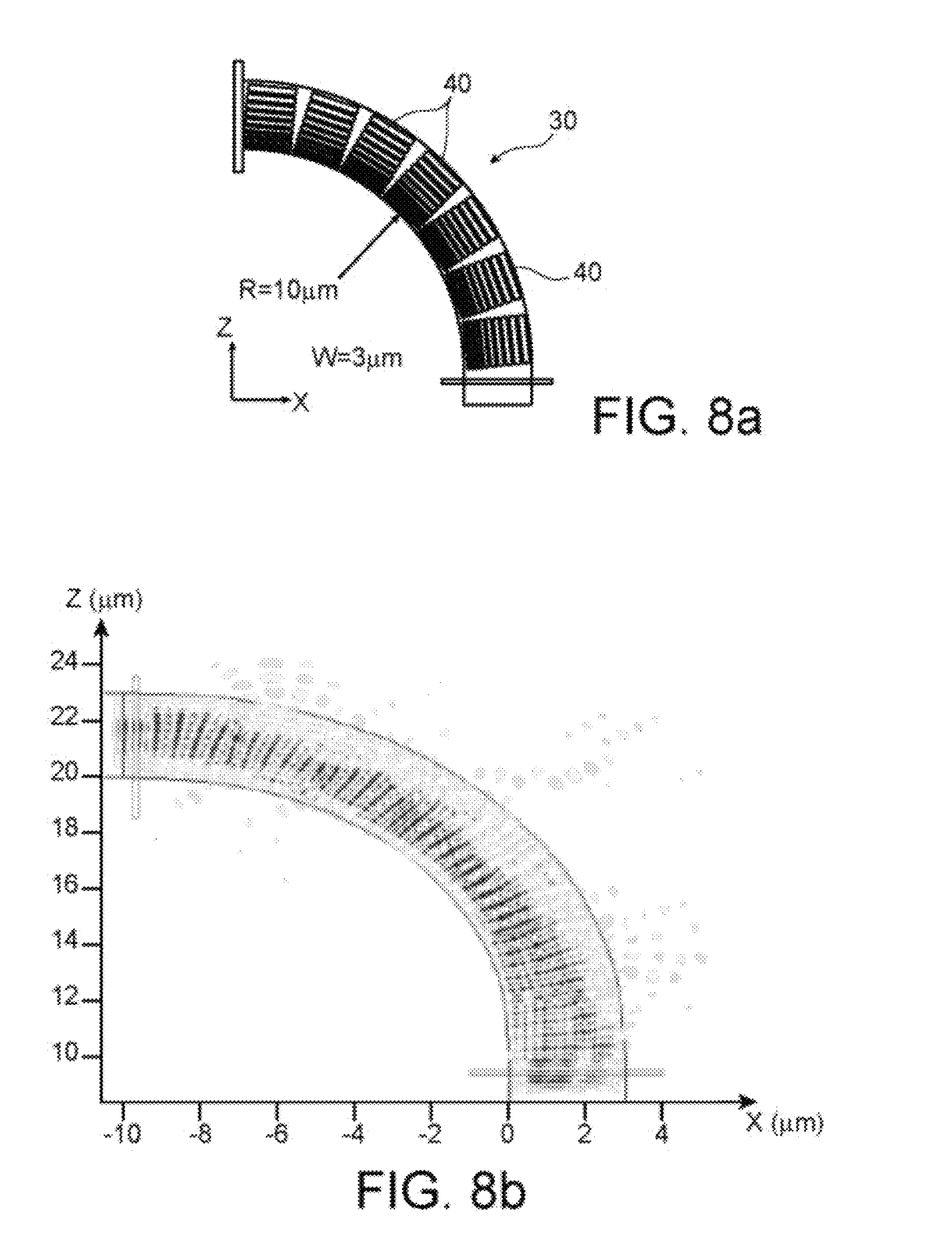
FIGS. 8a and 8b respectively illustrate a guide having a width of 3 µm that has a bend of 90° having a radius of curvature of 10 µm provided with a plurality of rectilinear regions with a pseudo-index gradient distributed along the bend and the electromagnetic-field distribution inside the latter.

FIGS. 7a, 7b and FIGS. 8a, 8b aim to illustrate the effectiveness of this embodiment. FIGS. 7a and 7b respectively illustrate a guide made of silicon confined in a cladding made of silica, having a width W equal to 3 µm and which has a bend of 90° having an inner radius of curvature R of 10 m not provided with a section with a pseudo-index gradient and the electromagnetic-field distribution inside the latter. As for FIGS. 8a and 8b, they illustrate the same guide, the curved transition section 30 of which comprises, for reasons of simplification of the FDTD-2D calculations, a plurality of regions 40 with a pseudo-index gradient. As shown in FIG. 8a, these regions 40 are distributed along the transition section 30 in angular increments, here of 15° ([0, 15, 30, 45, 60, 75, 90]°).

For such a guide width (3 µm), in the absence of the implementation of the invention, the minimum radius of curvature for which the radiation losses are minimal is much greater than 10 µm. It is not therefore surprising to observe a transmission effectiveness (effectiveness of coupling to the fundamental mode, i.e. identical to the input mode) of less than 2.5% for the curve of FIG. 7a. In the context of the invention (FIGS. 8a and 8b), a coupling effectiveness of 56% is observed.

This remarkable coupling effectiveness is obtained, even though a large portion of the curved section 30 is not covered by a region with a pseudo-index gradient and these regions are identical to that used in the rectilinear transition section of FIG. 3 and they thus have trenches extending in a straight and not curved manner in the direction of propagation of the light.

Thus in an alternative embodiment, trenches curved according to the curvature of the transition section are adopted. The (pseudo-)index gradient thus extends perfectly between the inside and the outside of the curvature. These curved trenches further preferably extend over the entire length of the transition section.

Figure 9A:
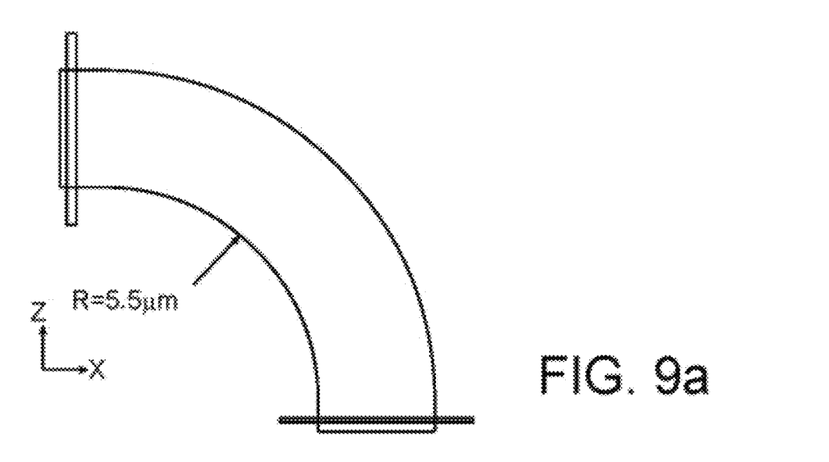
FIGS. 9a and 9b respectively illustrate a guide having a width of 3 µm that has a bend of 90° having a radius of curvature of 5.5 µm not provided with a section with a pseudo-index gradient and the electromagnetic-field distribution inside the latter.
Figure 9B:
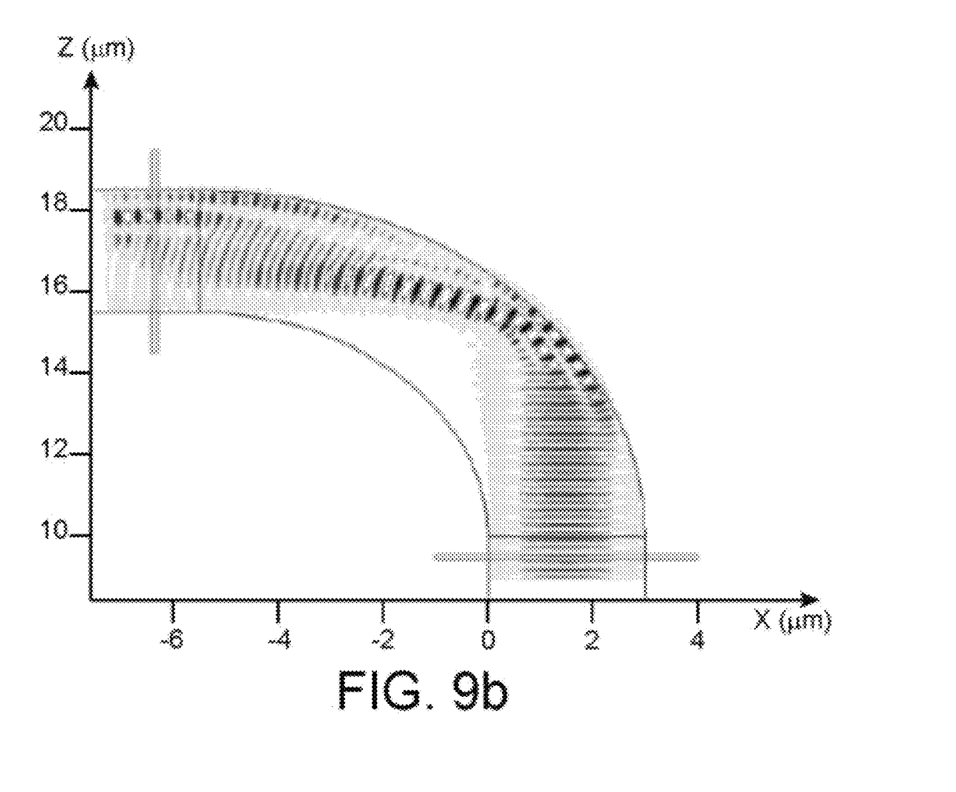
Figure 10A:
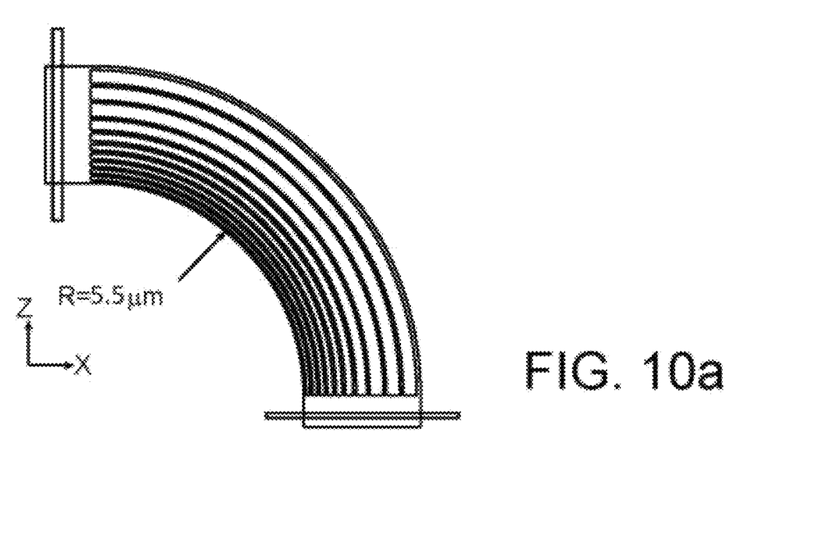
FIGS. 10*a* and 10*b* respectively illustrate a guide having a width of 3 μm that has a bend of 90° having a radius of curvature of 5.5 μm provided with a curved region with a pseudo-index gradient over the entire length of the bend and the electromagnetic-field distribution inside the latter.
Figure 10B:
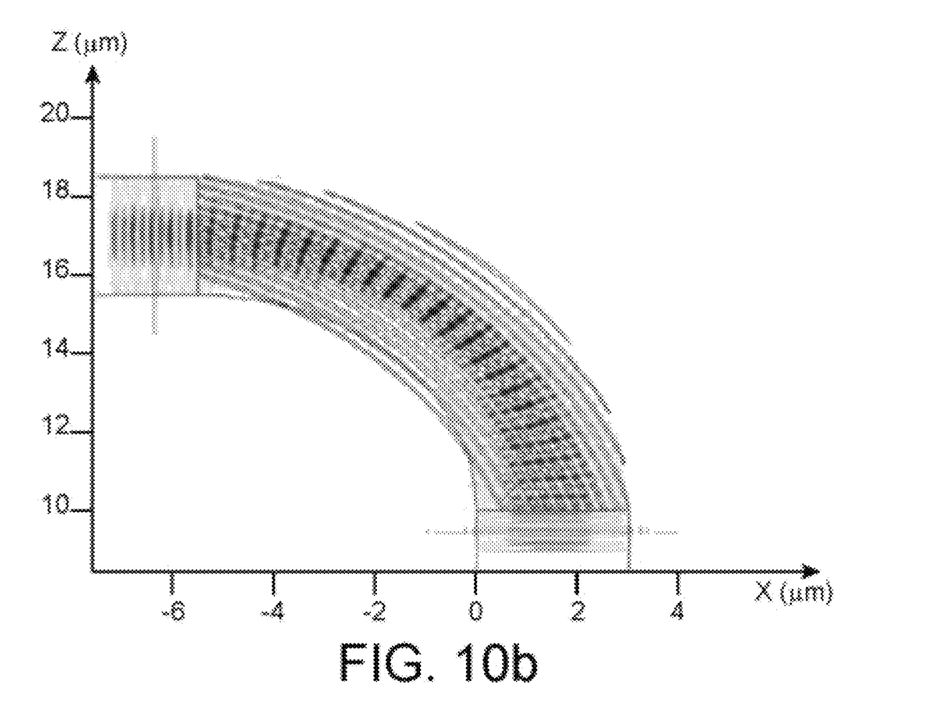

FIGS. 9a, 9b and FIGS. 10a, 10b aim to illustrate the effectiveness of this embodiment. FIGS. 9a and 9b respectively illustrate a guide made of silicon confined in cladding made of silica, having a width of 3 m that has a bend of 90° having an inner radius of curvature of 5.5 µm, not provided with a region with a pseudo-index gradient and the electromagnetic-field distribution inside the latter. FIGS. 10a and 10b respectively illustrate the same guide provided with a region with a pseudo-index gradient over the entire length of the bend and the electromagnetic-field distribution inside the latter.

A modal coupling effectiveness of approximately 20% is observed in the absence of the implementation of the invention. This 20% is substantially caused by a mirror effect (cf. FIG. 9b), the curvature being so small (close to the width of the guide) that the bend is close to a right angle. This modal coupling effectiveness goes up to 92% for the guide with a pseudo-index gradient of the invention. Thus, the (pseudo-)index gradient between the inside and the outside of the curve maintains an almost-perfect confinement of the fundamental mode along the curve until a decoupling perfectly equivalent to the input mode. It is important to note here that the critical dimensions are in accordance with the current standards in silicon photonics with for example the small trench being 50 nm wide and the smallest non-structured space 65 nm, that is to say, values perfectly accessible via electron-beam lithography.

The invention is particularly advantageous for wide guides, over a plurality of ranges of wavelengths, thus allowing datacom/telecom uses (in the infrared) and sensors uses (in the medium- or large-wavelength infrared) in which the footprint on the chip is even more important at large wavelengths. The invention thus also extends to a photonic circuit comprising an optical guide as described above in order to carry out intra-chip communication.

What is claimed is:

1. An optical guide comprising a core made from a core material having a first refractive index, the core comprising a rectilinear input section oriented in an input direction, a rectilinear output section oriented in an output direction and a transition section between the rectilinear input section and the rectilinear output section, the rectilinear output direction being different that the rectilinear input direction in such a way that the light propagates in the optical guide between the rectilinear input section and the rectilinear output section in a propagation direction while being subjected to a bend having an inner side and an outer side, the transition section comprising a region with a pseudo-index gradient having an inner edge on the inner side of the bend and an outer edge on the outer side of the bend, wherein said region with a pseudo gradient-index comprises trenches having a second refractive index lower than the first refractive index of the core, said trenches having the same depth and being formed in the core in such a way that the pseudo gradient-index decreases from the inner edge towards the outer edge.

2. The optical guide according to claim 1, wherein the trenches are arranged in such a way that the pseudo gradient-index decreases linearly from the inner edge towards the outer edge.

3. The optical guide according to claim 1, wherein the light propagates along the length of the trenches.

4. The optical guide according to claim 1, wherein the trenches are arranged periodically between the inner edge and the outer edge, and the width of the trenches increases from one period to another from the inner edge towards the outer edge.

5. The optical guide according to claim 4, configured to guide an optical mode associated with a wavelength $\lambda$ and an effective refractive index neff, wherein the width of a period is less than the ratio of the wavelength $\lambda$ to the effective refractive index neff.

6. The optical guide according to claim 1, wherein the trenches are formed in such a way as to have an increasing density of trenches from the inner edge towards the outer edge.

7. The optical guide according to claim 1, wherein the difference between the first refractive index and the second refractive index is at least equal to 0.2.

8. The optical guide according to claim 1, wherein the width of the trenches increases progressively in the direction of propagation of the light until a threshold width is reached.

9. The optical guide according to claim 1, wherein the rectilinear input section, the rectilinear output section and the transition section have the same width.

10. The optical guide according to claim 1, wherein the transition section is a rectilinear section oriented in the input direction.

11. The optical guide according to claim 1, wherein the transition section is a curved section in the shape of an arc of a circle, the centre of curvature of which is to the inside of the bend.

12. The optical guide according to claim 11, wherein the transition section comprises a plurality of regions with a pseudo gradient-index.

13. The optical guide according to claim 11, wherein the trenches are curved according to the curvature of the transition section.

14. The optical guide according to claim 13, wherein the trenches extend over the entire length of the transition section.

15. A Photonic circuit comprising an optical guide according to claim 1.

* * * * *

UNITED STATES PATENT AND TRADEMARK OFFICE
CERTIFICATE OF CORRECTION

PATENT NO. : 10,551,563 B2
APPLICATION NO. : 16/332846
DATED : February 4, 2020
INVENTOR(S) : Karim Hassan et al.

Page 1 of 1

It is certified that error appears in the above-identified patent and that said Letters Patent is hereby corrected as shown below:

In the Specification

Column 6, Line 4, "10 m" should read -- 10 μm --.

Column 6, Line 38, "3 m" should read -- 3 μm --.

Signed and Sealed this
Nineteenth Day of May, 2020

Andrei Iancu
*Director of the United States Patent and Trademark Office*